Figure 1:
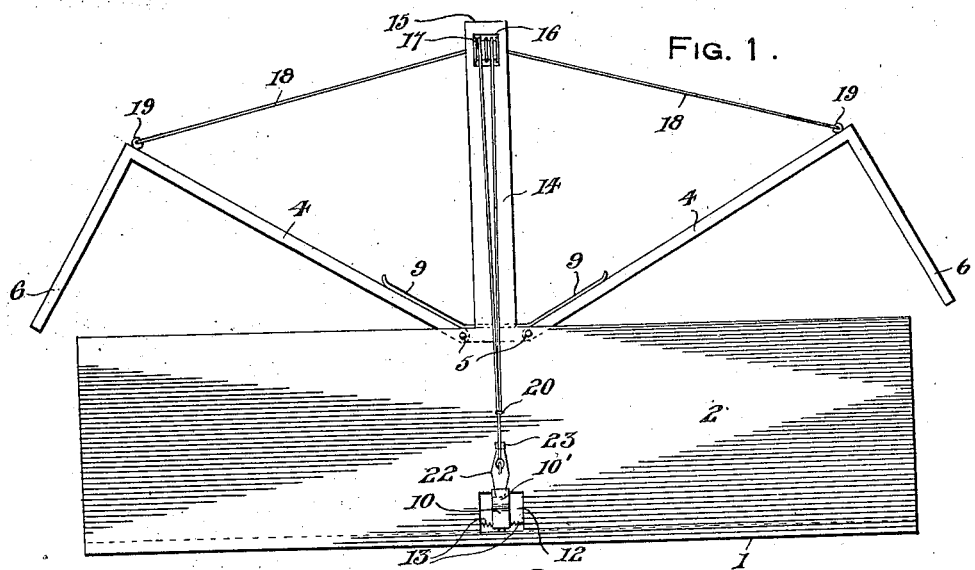

S. DYBOWSKI, DEC'D.
J. NAWACKA, ADMINISTRATRIX.
ANIMAL TRAP.
APPLICATION FILED JUNE 11, 1920.

1,380,785.

Patented June 7, 1921.
2 SHEETS—SHEET 1.

Inventor
S. Dybowski

A. M. Wilson
Attorney

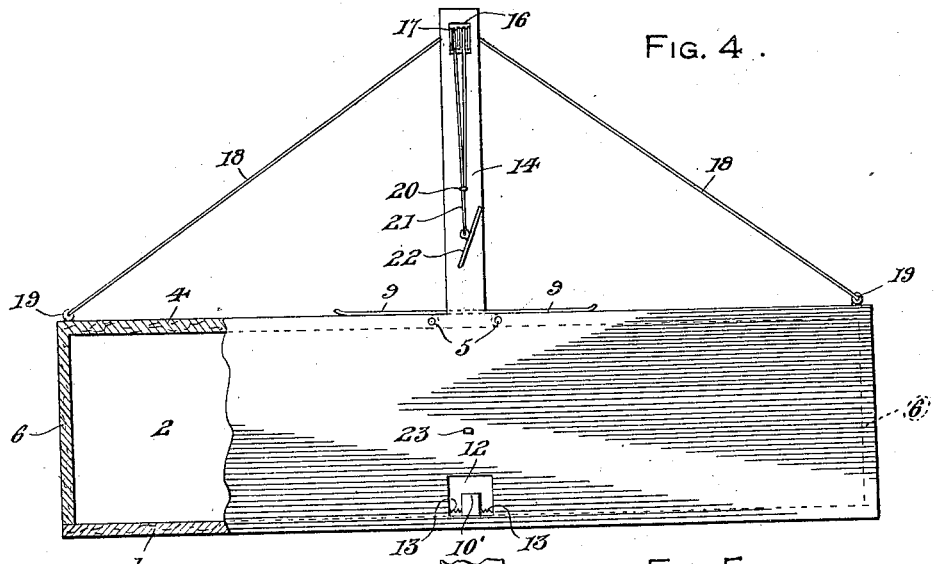
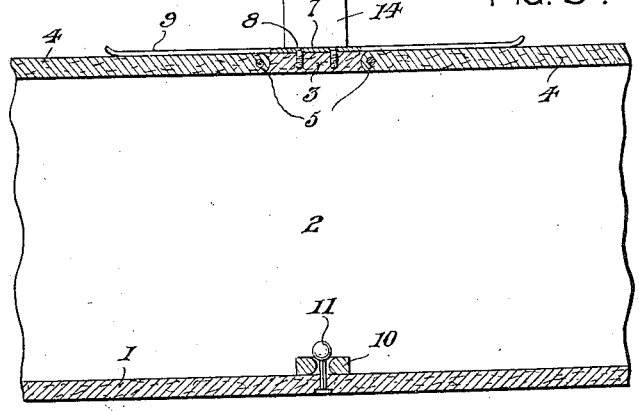
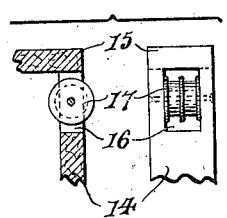
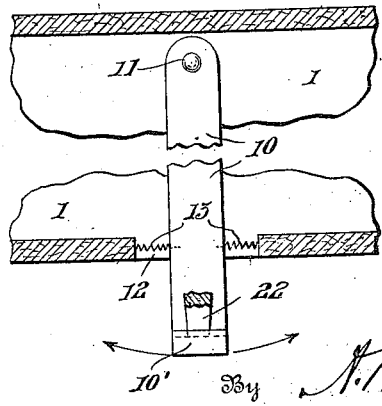

UNITED STATES PATENT OFFICE.

STANLEY DYBOWSKI, DECEASED, BY JUZEFA NAWACKA, ADMINISTRATRIX, OF ROCKFORD, ILLINOIS.

ANIMAL-TRAP.

1,380,785.   Specification of Letters Patent.   Patented June 7, 1921.

Application filed June 11, 1920. Serial No. 388,086.

*To all whom it may concern:*

Be it known that I, JUZEFA NAWACKA, a citizen of the United States, residing at Rockford, in the county of Winnebago and State of Illinois, am the duly-appointed administratrix of the estate of STANLEY DYBOWSKI, late a citizen of Poland, now deceased, the latter having invented certain new and useful Improvements in Animal-Traps, of which the following is a specification.

The present invention relates to certain new and useful improvements in animal traps and has for its object to provide a trap in which the animals are caught in a live condition and later disposed of in any suitable manner.

A further object of the invention is to provide an animal trap in which the opposite ends of the box-like structure are completely open when the trap is in a set position with a trip device arranged within the box-like structure to permit the closing of the end walls of the device for retaining a trapped animal therein.

With the above and other objects in view, the invention consists in the novel form, combination and arrangement of parts hereinafter more fully described and shown in the accompanying drawing, wherein like reference characters indicate similar parts throughout the several views.

Figure 2:
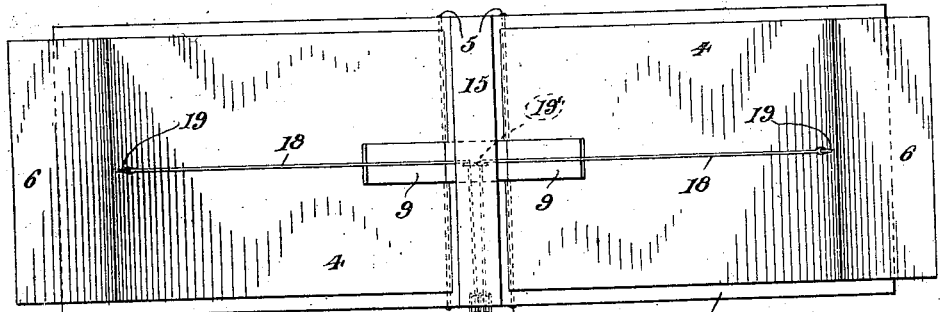
Figure 3:
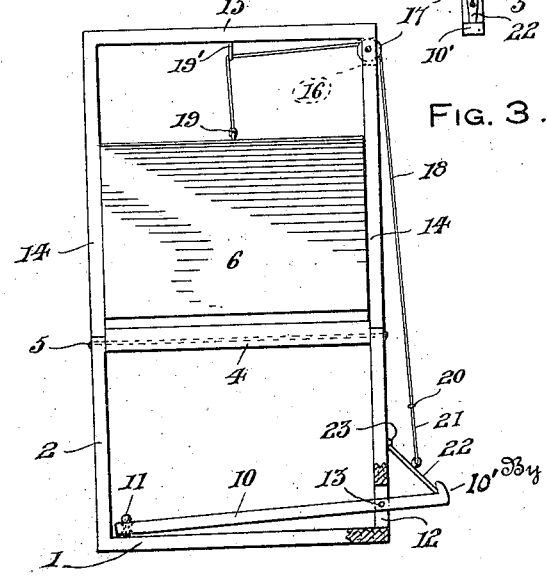

In the drawing,

Figure 1 is a side elevational view of a trap constructed in accordance with the present invention, the end gates being shown in their open set position, Fig. 2 is a top plan view of the same, Fig. 3 is an end elevational view partly in section to show the trip mechanism, Fig. 4 is a side elevational view partly in section, of the end gates in their closed position, Fig. 5 is a fragmentary detail sectional view showing the spring arms for retaining the end gates in their lowered positions, Fig. 6 is a fragmentary sectional view showing the trip lever, and Fig. 7 shows detail views of the guide sheaves for the cords.

Referring more in detail to the accompanying drawings, there is illustrated an animal trap in the form of a box-like structure including a bottom wall 1 and side walls 2 connected by a central bridge 3 as shown in Figs. 2 and 5 with the remaining upper portion of the box and ends thereof completely open. Trap doors are associated with the open portions of the upper sides and ends of the box and are of identical construction, each including a cover section 4 hinged as at 5 to the bridge 3 and carrying an angle end portion 6 that coöperates with the cover portion 4 to provide a closure for the open upper sides and ends of the box so that when the trap door sections are in their lowered positions as shown in Fig. 4, a complete housing is provided. Spring arms are secured to the bridge piece 3 for maintaining the trap doors in their lowered positions and includes a central portion 7 anchored by suitable fastening devices 8 to the bridge piece 3 and carrying oppositely directed arms 9 overlying the cover sections 4 for resiliently maintaining the trap doors lowered.

The trip mechanism for holding the trap doors in the open set position shown in Fig. 1 includes a trip lever shown in detail in Figs. 3 and 6 as embodying an arm 10 secured by a loose pivot 11 centrally within the casing and projecting through the opening 12 provided in the forward side wall 2 of the casing. As shown in Fig. 6, coil springs 13 are secured to each side of the lever arm 10 with the opposite ends thereof frictionally engaging the adjacent side walls of the opening, the springs being of sufficient strength only to hold the lever arm in the elevated position shown in Fig. 3 against the weight thereof.

A pair of vertical standards 14 project upwardly from the side walls 2 at the point of connection of the bridge piece 3 and are connected at their upper ends by a cross arm 15. The upper end of the standard 14 adjacent the side wall provided with the opening 12 is pivoted with a cut-out portion 16 in which a pair of sheaves 17 is journaled. A pair of cords 18 are respectively connected to eye-bolts 19 secured to the opposite ends of the trap doors and have the opposite ends thereof inserted through the central hook 19′ depending from the cross arm 15 and over the sheaves 17 and terminate at the point 20 to continue with a single cord 21 for attachment to the trip rod 22.

When the device is in the set position shown in Figs. 1 and 3, the cords 18 are pulled over the sheaves 17 to elevate the trap doors 4 against the tension of the spring arms 9 with one end of the trip rod engaging the hook-bill 10' upon the lever arm 10 and the other end of the trip arm engaging the lug 23 upon the outer side of the adjacent wall 2. When so arranged, the lever arm 10 is maintained elevated by the frictional engagement of the ends of the springs 13 with the side walls of the opening and the trip latch 22 and cord connections 18 maintain the trap doors elevated. Bait of any desired character may be placed within the casing and upon the lever arm 10, and the weight of an animal or rodent thereon, will overcome the frictional contact of the springs with the walls of the opening 12 to cause the lever arm 10 to be lowered upon its loose pivot 11 and to release the prop 22 so that the spring arms 9 will automatically and quickly lower the trap doors to provide a completely closed casing with the trapped animal retained therein in a live condition and to be subsequently disposed of in any manner desired. While there is herein shown and described the preferred embodiment of the invention, it is nevertheless to be understood that minor changes may be made therein without departing from the spirit and scope of the invention as hereinafter claimed.

What is claimed as new is:

1. An animal trap of the character described comprising a casing, trap doors pivotally carried thereby, spring arms for maintaining the trap doors in their lowered closed positions, cords connected to said trap doors, a lever arm within said casing and projecting through one side wall thereof, a prop connection between the projecting end of said lever arm and the cords connected to said trap doors, said casing having an opening therein to facilitate the passage of said lever arm and springs secured to the opposite sides of said lever arm and frictionally engaging the side walls of the opening to hold the lever arm elevated against its weight, and being of insufficient strenght to maintain the arm elevated with an animal resting on the lever arm.

2. An animal trap of the character described comprising a casing, a trap door carried by each end thereof, a frame superposed on said casing, sheaves journaled in said frame, operating cords connected to said trap doors and passing over said sheaves, said casing having a relatively wide opening in one side wall thereof, a lever arm loosely pivoted at one of its ends within the casing and freely projecting through said opening, spring devices associated with the lever arm and side walls of said opening for maintaining the lever arm elevated against the weight thereof and a prop carried by said operating cords and engaging the projecting end of said lever arm to hold the trap doors elevated.

3. An animal trap of the character described comprising a casing a trap door carried by each end thereof, a frame superposed on said casing, sheaves journaled in said frame, operating cords connected to said trap doors and passing over said sheaves, said casing having a relatively wide opening in one side wall thereof, a lever arm loosely pivoted at one of its ends within the casing and freely projecting through said opening, spring devices associated with the lever arm and side walls of said opening for maintaining the lever arm elevated against the weight thereof, a prop carried by said operating cords and engaging the projecting end of said lever arm to hold the trap doors elevated, and a flat spring secured intermediate its ends to the casing with the opposite ends overlying the adjacent trap doors for closing the trap doors when the trap lever is released from the lever arm.

In testimony whereof I affix my signature.

JUZEFA $\overset{\text{her}}{\underset{\text{mark}}{\times}}$ NAWACKA,

*Administratrix of Stanley Dybowski, deceased.*

Witnesses to mark:
DAVID D. MADDEN,
ROBERT E. NASH.